O. T. ISAACSON.
ENGINE CRANKING DEVICE.
APPLICATION FILED JULY 29, 1912.
1,067,657.
Patented July 15, 1913.
2 SHEETS—SHEET 1.
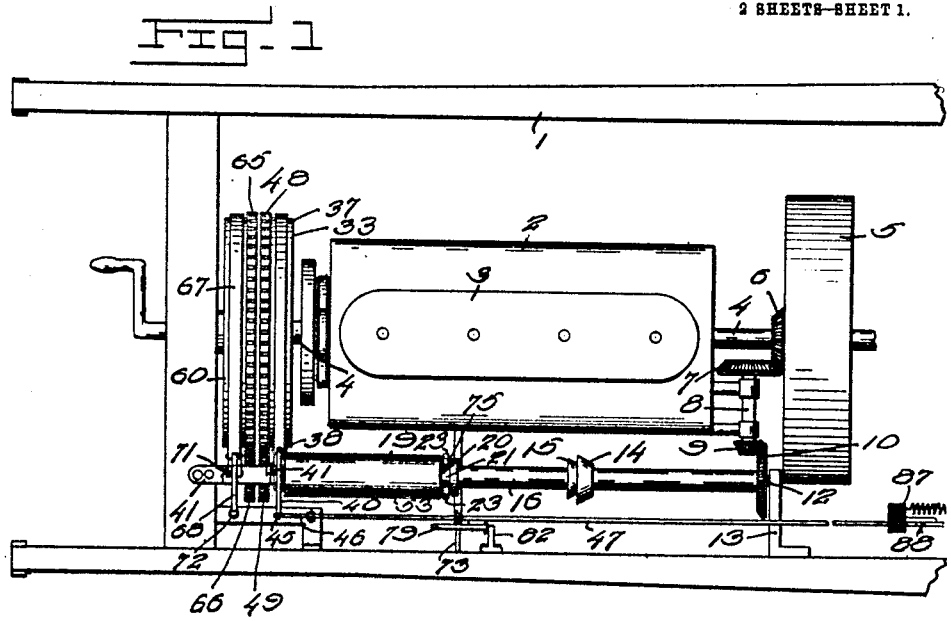
Inventor
O. T. Isaacson,
By C. L. Parker,
Attorney
Witnesses O. T. ISAACSON.
ENGINE CRANKING DEVICE.
APPLICATION FILED JULY 29, 1912.
1,067,657.
Patented July 15, 1913.
2 SHEETS—SHEET 2.
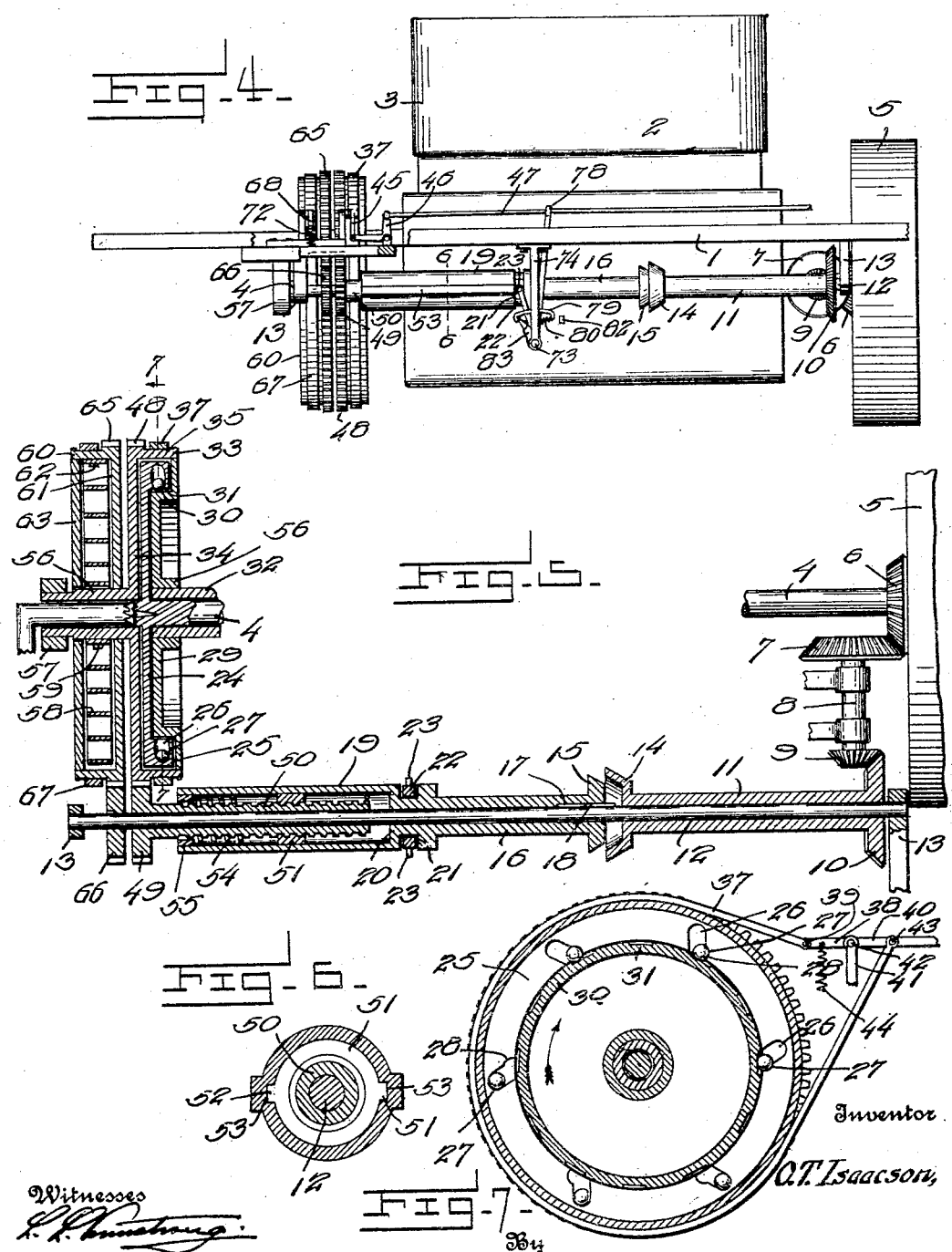

UNITED STATES PATENT OFFICE.

OLIVER T. ISAACSON, OF CHAMPAIGN, ILLINOIS.

ENGINE-CRANKING DEVICE.

1,067,657.  Specification of Letters Patent.  Patented July 15, 1913.

Application filed July 29, 1912.  Serial No. 711,981.

*To all whom it may concern:*

Be it known that I, OLIVER T. ISAACSON, a citizen of the United States, residing at Champaign, in the county of Champaign and State of Illinois, have invented certain new and useful Improvements in Engine-Cranking Devices, of which the following is a specification.

The present invention relates broadly to a device for cranking an internal combustion engine and has particular reference to such a device designed to be mounted upon an automobile and including a motor which is driven during the operation of the engine to store up power, which is subsequently used to crank the engine when the same is at rest.

An important object of the invention is to provide a device of the above mentioned character, which is controlled in its operation by a manually operated lever or pedal, such device operating automatically to crank the engine and subsequently having a limited operative connection with the engine when it is running, so that said device is driven for storing power for again cranking the engine.

A further object of the invention is to provide a device of the above mentioned character, including a spring motor which is connected with the engine when running, to be wound up, and automatically disconnected when the spring is placed under the desired tension.

Other objects and advantages of the invention will be apparent during the course of the following description.

In the accompanying drawings forming a part of this specification and in which like numerals are employed to designate like parts throughout the same, Figure 1 is a plan view of the device as applied to the engine of an automobile, Fig. 2 is a front end view of the same, Fig. 3 is a perspective view of a transverse rock-shaft and associated elements, Fig. 4 is a side view of the entire device, Fig. 5 is a horizontal sectional view through the same, the engine being omitted, Fig. 6 is a transverse section view taken on line 6—6 of Fig. 4, Fig. 7 is a similar view taken on line 7—7 of Fig. 5, and, Fig. 8 is a detail view of a pawl, parts being in section.

In the drawings wherein, for the purpose of illustration, I have shown a preferred embodiment of my invention, the numeral 1 designates the longitudinal beams of the frame-work of an automobile.

The numeral 2 designates an internal combustion engine of any well known or preferred type, which is suitably supported by this frame-work. The engine 2 comprises explosion cylinders 3, crank-shaft 4 and fly-wheel 5. It is thought that no further detail description of the engine is necessary.

Rigidly connected with the rear portion of the crank shaft 4 is a bevel gear 6, engaging a bevel gear 7, which is rigidly connected with a transverse shaft 8. This transverse shaft is provided with a small bevel gear 9, rigidly connected therewith, which engages a large bevel gear 10, as shown. The bevel gear 10 is rigidly connected and preferably formed integral with a sleeve 11, which is mounted to rotate upon a longitudinally extending rotatable shaft 12 but cannot partake of perceptible longitudinal movement with relation to the same. It is to be understood that any suitable form of driving connecting means may be interposed between the shaft 4 and the sleeve 11. The longitudinal shaft 12 is journaled through fixed bearings 13. Rigidly connected and preferably formed integral with the sleeve 11 is a conical clutch element 14, adapted to be engaged and disengaged by a coacting conical clutch element 15, which is rigidly connected and preferably formed integral with a sleeve 16. It is thus seen that the clutch elements 14 and 15 form a clutch mechanism which, when connected, serves to rotate the shaft 12 and sleeve 16. Instead of employing this form of clutch mechanism including the conical clutch elements 14 and 15, any other suitable form of clutch mechanism may be used. The sleeve 16 cannot rotate upon the longitudinal shaft 12 but may have restricted longitudinal movement upon the same, by virtue of the fact that the same is provided with a longitudinal groove 17, to receive a longitudinal spline 18, rigidly connected with the shaft 12. Rigidly connected and preferably formed integral with the sleeve 16 is a preferably cylindrical housing or casing 19, having one end thereof formed open and the opposite end closed by a head 20, provided with an annular groove 21, for receiving a ring 22, which carries diametrically arranged trunnions 23, as shown.

The forward end of the crank shaft 4 has a disk 24 rigidly connected and preferably formed integral with the same. This disk is included in the clutch mechanism which turns the crank-shaft 4 for starting the engine. The disk 24 is provided near its periphery with a laterally extending annular portion 25, provided with inclined openings or pockets 26 for receiving balls 27. The pockets 26 are provided upon corresponding sides and near their inner ends with recesses 28 within which the balls 27 are adapted to fit when the disk 24 is rotating in one direction only. The numeral 29 designates an inner disk coöperating with the disk 24 and included in the said clutch mechanism. This disk 29 is provided with an annular shoulder 30 disposed within the annular portion 25, and provided with recesses 31 for receiving the inner portions of the balls 27. I do not wish to restrict myself to the use of the balls or locking elements 27 alone, as any other suitable means may be employed. The disk 29 is freely rotatable upon a portion 32 of the crank case of the engine, which serves as a bearing for the crank-shaft 4, as shown. Surrounding the clutch mechanism including the co-acting disks 24 and 29 is a rotatable drum 33 including a disk 34 provided with an annular flange 35, to which the disk 29 is rigidly connected by means of bolts or the like. When the disk 29 is rotated in the direction as indicated by the arrow in Fig. 7, to crank the engine, it is obvious that the balls 27 will then lock the same with the co-acting disk 24, whereby the crank-shaft 4 will be turned. When the disk 24 is rotating in the direction as indicated by the arrow in Fig. 7, during the operation of the engine, it is obvious that the same will not turn the co-acting disk 29.

The drum 33 is normally prevented from rotating in the direction for cranking the engine by a brake band 37, having one end thereof pivotally connected with a lever 38, as shown at 39. The lever 38 is rigidly connected with a lever 40, the two levers being pivotally mounted upon a support 41, as shown at 42. The opposite end of the brake band is pivotally connected with the lever 40, as shown at 43. A retractile coil spring 44 is connected with one end of the lever 38, and normally serves to swing the levers 38 and 40 in one direction to cause the brake band to clamp or lock the drum 33 against rotation in one direction for cranking the engine. A link 45 connects one end of the lever 40 with a pivoted bell-crank lever 46 (see Figs. 1 and 4), which is swung by a rigid rod 47, pivotally connected therewith. It is thus seen that when the rod 47 is moved forwardly, the levers 38 and 40 will be swung in opposition to the spring 44 to slacken the brake band 37, whereby the drum 33 will be allowed to spin to crank the engine. The disk 34 of the drum 33 is provided with pinion teeth 48, which engage a pinion 49, preferably formed integral with a screw-threaded sleeve 50, which is free to rotate upon the longitudinal shaft 12 but cannot partake of perceptible longitudinal movement with relation to the same. The screw-threaded sleeve 50 extends into the housing 19 and is engaged therein by a nut 51 having a screw-threaded opening to receive the same. The nut 51 is provided with preferably diametrically arranged keys or ribs 52, which are slidably mounted within grooves 53 formed in the housing 19. It is thus seen that the nut 51 is splined within the housing 19 so that the same is rotatable with the housing and is also capable of moving longitudinally therein. This nut engages a coil spring 54, which in turn engages a ring 55, which is rigidly connected with one end of the housing 19. When the nut 51 moves into engagement with the spring 54 and sufficiently compresses the same, the housing 19 and sleeve 16 are moved longitudinally to the left to disengage clutch elements 14 and 15. Attention is called to the fact that when the housing 19 is rotated it turns the nut 50 to cause the same to travel into engagement with the spring 54 while when pinion 49 turns the screw 50, such screw will cause the nut 51 to travel in a reverse direction.

The disk 34 carries a tubular hub 56, which is journaled within a transverse bearing 57. Surrounding the tubular hub 56 is a spring motor including a suitably stiff coil spring 58, having its inner end rigidly connected with the hub 56 by a bolt 59 or the like. The outer end of this coil spring is attached to an annular flange 60 of a rotatable drum 61 by means of a bolt 62 or the like. One side of the drum 61 is closed by a disk 63, which is rigidly connected with the flange 60 by bolts. The drum 63 is provided with pinion teeth 65, which engage a pinion 66 rigidly connected with the forward end of the longitudinal shaft 12. The shaft 12, when rotated, drives the pinion 66 which in turn rotates the drum 63 to wind up the spring 58.

The numeral 67 designates a brake band surrounding the flange 60 and allowing the drum 66 to be rotated in the direction to wind up the spring but to always prevent this drum from rotating in a reverse direction. One end of the brake band 67 (see Fig. 2) is pivotally connected with a lever 68, as shown at 69, and the opposite end of this brake is pivotally connected with the lever 68, as shown at 70. The lever 68 is pivotally mounted upon a fixed support 71 and the same has connection with a retractile coil spring 72, which normally holds the lever 68 in a position to cause brake band 67 to frictionally engage the flange 60 for positively preventing the drum 63 from rotating in a direction to allow the spring 58 to unwind.

The numeral 73 (see more particularly Fig. 3) designates a transverse rock-shaft having its ends journaled through stationary bearings 74. This rock-shaft has a forked crank arm 75 rigidly connected therewith, which extends upwardly to have operative connection with the trunnions 23. A crank arm 76 is also rigidly connected with the rock-shaft 73 and has connection with a compression spring 77, which serves to hold the rock-shaft in either of its positions, when moved thereto.

The numeral 78 designates a lever which is mounted upon the rock-shaft 73 to swing with relation to the same. Pivotally connected with the lever 78 is a pawl 79 engaging a compression spring 80 which normally serves to force the forward end 81 of this pawl downwardly. A stationary trip 82 is disposed in the path of travel of the rear end of the pawl 79, and engages the same to raise the forward end 81 when the lever 78 is swung rearwardly.

The numeral 83 designates a pawl which is mounted upon the rock-shaft 73 and is adapted to partake of restricted swinging movement with relation to the same in a forward direction. The pawl 83 has its hub portion provided with a segmental opening 84 for receiving a pin 85 rigidly attached to the shaft 73. A spring 86 serves to swing the pawl 83 forwardly when it is released by the pawl 79.

The rod 47 is pivotally connected with the upper end of the lever 78, as shown at 86 and this rod extends rearwardly past the lever 78 for pivotal connection with a treadle 87, as shown at 88.

The operation of the device is as follows: Assuming that the engine is at rest and the spring 58 wound up, the operator presses the pedal 87 forwardly, whereby rod 47 will move forwardly to swing levers 38 and 40 in a direction to slacken brake band 37. The disk 34 will now rotate and the same being connected or locked with the disk 24 through the balls 27, which engage the annular shoulder 30, said disk 24 will spin the shaft 4 for cranking the engine. When the clutch elements 14 and 15 are disconnected, as shown in Fig. 5, the crank arm 75 will occupy the position shown in Fig. 3. After the engine is cranked the pedal 87 is released and allowed to return to its normal position whereby brake band 37 will prevent the further turning of the disk 34 in a direction to crank the engine. When the pedal 87 thus moves rearwardly, the rod 47 is moved rearwardly to swing the lever 78 in the same direction. The pawl 79 engages the pawl 83 and turns the rock-shaft to bring the crank arm 75 into the position shown in dotted lines, subsequently to which the stationary trip will move the pawl 79 so that said pawl will disengage the pawl 83. The spring 77 serves to hold the crank arm 75 in either of its operative positions. When the crank arm 75 is thus moved to its lower position, the sleeve 17 is moved rearwardly to bring the clutch elements 14 and 15 into frictional engagement. When the disk 34 is rotating to crank the engine the pinion teeth 48 rotate the pinion 49 in a direction to cause the nut 51 to travel to the right to release the tension on the spring 54. The spring 77 will now be under sufficient tension to overcome the reduced tension of the spring 54, whereby said spring 77 will retain the rock-shaft 73 in the position now occupied. The cone 15 now engages the cone element 14, whereby the shaft 12 is rotated, the sleeve 16 of course rotating with it. The pinion 66 will now turn the disk 65 to wind up the spring 58. The nut 51 is now being rotated by the sleeve 19 and is compressing the coil spring 58. By the time this coil spring 58 is sufficiently wound up, the spring 54 is placed under sufficiently high tension to overcome the tension of the spring 77, whereby the elements 14 and 15 are automatically disconnected by the longitudinal movement of the sleeve 16 to the left. The device is again operated for cranking the engine by pressing on the pedal 87.

It is to be understood that the form of my invention herewith shown and described is to be taken as a preferred example of the same and that certain changes in the shape, size, and arrangement of parts may be resorted to without departing from the spirit of the invention or the scope of the subjoined claims.

Having thus described my invention, I claim:—

1. In a device of the character described, a crank shaft of an engine, a bodily rotatable element associated with the crank shaft, clutch mechanism between the bodily rotatable element and the crank shaft, brake mechanism to control the rotation of the element in one direction, manually operated means to operate the brake mechanism, a motor to turn the rotatable element, connecting means between the motor and the crank shaft, and means operated by and upon the return of the manually operated means to its normal position after the same has actuated the brake mechanism, to render the connecting means operative, whereby said motor will be driven by the crank shaft.

2. In a device of the character described, the combination with the crank shaft of an internal combustion engine, of a bodily rotatable element associated with the crank shaft, clutch mechanism between the bodily rotatable element and the crank shaft, means to normally prevent the rotation of said element in one direction, manually operated mechanism to actuate said means, a spring motor to turn the rotatable element, normally inoperative connecting means between the spring motor and the crank shaft, a device operated by and upon the return of the manually operated mechanism to its normal position after the same has actuated the first named means which controls rotation of said element, to render said connecting means operative, whereby the spring motor will be driven by the crank shaft, and automatic means to again render the connecting means inoperative after the spring motor is sufficiently wound up.

3. The combination with a crank shaft of an engine, of a plurality of rotatable drums, means to control the rotation of the drums, a spring mounted within one drum and connected with the other drum, clutch mechanism mounted in said other drum and serving to connect the same with the crank shaft, a rotatable shaft, a gear connected therewith to drive the drum containing the spring, a second gear driven by the other drum and connected with a screw-threaded sleeve which is rotatable upon said rotatable shaft, a sleeve and housing splined upon the rotatable shaft, a nut engaging the screw-threaded sleeve and splined within the housing to be rotated thereby in one direction to cause said housing to move longitudinally in one direction, a driving sleeve rotatable upon said shaft and driven by the crank shaft, clutch mechanism interposed between the sleeve carrying the housing and the driving sleeve, and means to move the housing sleeve in one direction to render the last named clutch mechanism operative.

4. In a device of the character described, the combination with the crank shaft of an engine, of a plurality of rotatable drums, separate means to control the rotation of said drums, clutch mechanism between one drum and the crank shaft, a spring connected with both drums, driving connecting means connected with the crank shaft and including a gear which engages one drum, means to render such connecting means operative, and means to render said connecting means inoperative, including a gear engaging the other drum.

5. In a device of the character described, the combination with the crank shaft of an engine, of spring and operating drums, clutch mechanism between the operating drum and the crank shaft, a spring mounted in the spring drum and connected therewith and with the operating drum, means to prevent the rotation of the spring drum in one direction, a device to normally prevent the rotation of the operating drum in one direction, manually actuated means to operate said device, normally inoperative driving connecting means between the crank shaft and the spring drum including an element which is shifted by the manually actuated means upon its return movement, to render the connecting means operative, and means driven by the operating drum to render said driving connecting means inoperative.

6. In a device of the character described, the combination with the crank shaft of an engine, of spring and operating drums provided with pinion teeth, a spring connected with both drums, means to normally prevent the rotation of the spring drum in one direction, a device to normally prevent the rotation of the operating drum in one direction, normally inoperative driving connecting means between the crank shaft and the spring drum pinion, manually operated means to operate the device which controls the rotation of the operating drum, means operated upon the return movement of the manually operated means to render said driving connecting means operative, and means operated by the operating drum pinion to again render the driving connecting means inoperative.

7. In a device of the character described, the combination with the crank shaft of an engine, of spring and operating drums, a spring connected with both drums, means to normally prevent the rotation of the spring drum in one direction, a device to normally prevent the rotation of the operating drum in one direction, gears associated with said drums, clutch mechanism forming normally inoperative driving connecting means between the crank shaft and the spring drum gear including a longitudinally movable sleeve, manually operated means to operate the device which controls the rotation of the operating drum, means operated upon the return movement of the manually operated means to move the longitudinally movable sleeve, a block provided with a screw-threaded opening and splined within the sleeve, a spring mounted in the sleeve to oppose the movement of the block in one direction, and a screw-threaded element connected with the operating drum gear and passing through said block.

8. The combination with a crank shaft of an engine, of a plurality of rotatable drums, a spring mounted in one drum and connected with the other drum, a brake band surrounding the spring holding drum to permit of its rotation in one direction only, clutch mechanism mounted within the other drum to connect the same with the crank shaft only when said other drum is rotated in one direction, a brake band to normally prevent the rotation of said other drum in one direction, means to slacken the brake band, means operated by the crank shaft of the engine to turn the spring holding drum to wind up the spring, and automatic means to stop the operation of said means when the spring is sufficiently wound up.

In witness whereof, I affix my signature in the presence of two witnesses.

OLIVER T. ISAACSON.

Witnesses:
W. A. SCHNEIDER,
EDITH A. HOBSON.

Copies of this patent may be obtained for five cents each, by addressing the "Commissioner of Patents, Washington, D. C."